(12) United States Patent
Chlystek et al.

(10) Patent No.: US 11,608,893 B2
(45) Date of Patent: Mar. 21, 2023

(54) LIGHT WEIGHT HOLE PLUG

(71) Applicant: ILLINOIS TOOL WORKS INC., Glenview, IL (US)

(72) Inventors: Thomas Michael Chlystek, Darien, IL (US); Tao Wang, Yokosuka Kanagawa (JP); Gregory Mamelson, Saint John, IN (US)

(73) Assignee: Illinois Tool Works Inc., Glenview, IL (US)

( * ) Notice: Subject to any disclaimer, the term of this patent is extended or adjusted under 35 U.S.C. 154(b) by 866 days.

(21) Appl. No.: 16/414,380

(22) Filed: May 16, 2019

(65) Prior Publication Data

US 2019/0360587 A1 Nov. 28, 2019

Related U.S. Application Data

(60) Provisional application No. 62/676,313, filed on May 25, 2018.

(51) Int. Cl.
*F16J 13/14* (2006.01)
*B62D 25/24* (2006.01)

(52) U.S. Cl.
CPC ............... *F16J 13/14* (2013.01); *B62D 25/24* (2013.01)

(58) Field of Classification Search
CPC ............. F16J 13/14; F16J 13/02; B62D 25/24
See application file for complete search history.

(56) References Cited

U.S. PATENT DOCUMENTS

| 3,706,391 | A | * | 12/1972 | Wibrow | B63B 19/00 220/323 |
| 5,454,479 | A | * | 10/1995 | Kraus | F16B 21/088 215/DIG. 1 |
| 5,893,480 | A | * | 4/1999 | Dore | B62D 25/24 220/780 |
| 6,562,477 | B1 | * | 5/2003 | Leon | B65D 39/0023 525/88 |
| 7,757,997 | B2 | * | 7/2010 | Smutny | F16B 21/086 24/453 |
| 8,286,924 | B2 | * | 10/2012 | Sano | F16B 21/086 24/297 |
| 8,495,802 | B2 | * | 7/2013 | Okada | B60R 13/0206 24/453 |
| 2006/0220376 | A1 | * | 10/2006 | Pangallo | B62D 25/24 285/202 |

(Continued)

FOREIGN PATENT DOCUMENTS

CA 2166269 A1 7/1996
CN 1142019 A 2/1997

(Continued)

*Primary Examiner* — Eugene G Byrd
(74) *Attorney, Agent, or Firm* — Quarles & Brady LLP (57) ABSTRACT

A hole plug includes a main body having an inner surface, a perimeter, and which further includes a center axis that is substantially perpendicular to the inner surface and defines an axial direction. Additionally, a securing member extends axially from the inner surface and includes a base directly secured to the inner surface of the main body and a cantilevered protuberance at least partially axially spaced from the inner surface. Furthermore, the protuberance at least partially extends along a circumferential path that is a parallel curve of the perimeter positioned inward from the perimeter.

19 Claims, 10 Drawing Sheets (56) References Cited

U.S. PATENT DOCUMENTS

| | | | |
|---|---|---|---|
| 2010/0025547 A1 | 2/2010 | Smutny et al. | |
| 2011/0005141 A1* | 1/2011 | Leverger | B62D 25/24 49/463 |
| 2013/0263515 A1 | 10/2013 | Laukhuf et al. | |
| 2016/0068314 A1* | 3/2016 | Jatzke | B65D 45/16 220/305 |
| 2016/0176446 A1* | 6/2016 | Kanie | B62D 25/24 296/1.06 |
| 2019/0211929 A1* | 7/2019 | Chlystek | F16J 13/14 |

FOREIGN PATENT DOCUMENTS

| | | | | |
|---|---|---|---|---|
| JP | 2011064296 A | * | 3/2011 | |
| JP | 2012241777 A | * | 12/2012 | ............. B62D 25/24 |
| JP | 2013079709 A | * | 5/2013 | |
| JP | 2014214826 A | * | 11/2014 | |
| JP | 2018040470 A | * | 3/2018 | ............. B62D 25/24 |
| JP | 2019065878 A | * | 4/2019 | ............. B62D 25/20 |

* cited by examiner

LIGHT WEIGHT HOLE PLUG

RELATED APPLICATIONS

This application claims the benefit of U.S. Provisional Application No. 62/676,313 filed on May 25, 2018, which is hereby incorporated by reference in its entirety.

FIELD OF THE DISCLOSURE

Embodiments of the present disclosure generally relate to hole plugs and, more particularly, to hole plugs that are light weight and robust.

BACKGROUND

Various assemblies in numerous industries may include components, such as panels, that connect to one another. Automobile assemblies, for example, include panels and structures connected to other panels or structures, or to an automobile frame. These panels or structures may have holes formed therein for many purposes. For example, during an assembly process, the holes may receive and retain fasteners, or allow tubing, wiring, or the like to pass therethrough. As another example, some components are designed with extra holes to reduce the number of different variations of a component, ultimately simplifying production inventory, e.g. a panel having a variation with holes on the left side and a variation with holes on the right side would be fabricated to have holes on both the left and right sides. A further example would be products designed to have holes reserved for future functionality, such as for receiving or mounting after-market accessories. In the aforementioned instances, however, a hole or several holes may not be utilized in the final product.

Hole plugs are often used to securely cover and close holes formed in panels of a component. A common hole plug is formed of a resilient material, such as rubber, that allows the hole plug to flex. A sealing agent is commonly dispensed on the hole plug before installation into a hole of a mating surface to create a fluid-tight barrier. The hole plug and the mating surface are then baked to set the sealing agent, securing the hole plug in place. The sealing agent, however, may fail over time, causing the hole plug to unfasten from the mating surface.

Figure 1A:
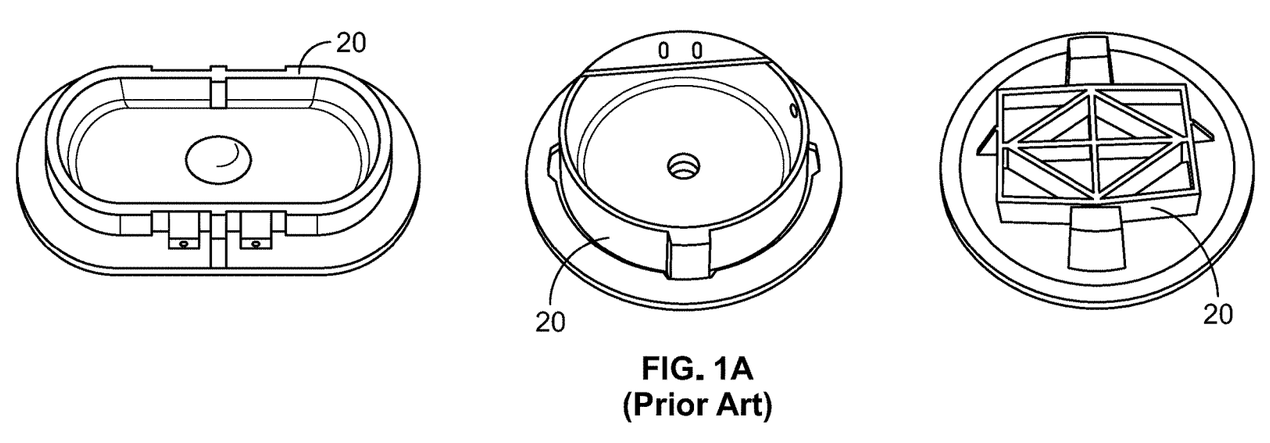
FIGS. 1A and 1B illustrate views of known hole plugs.
Figure 1B:
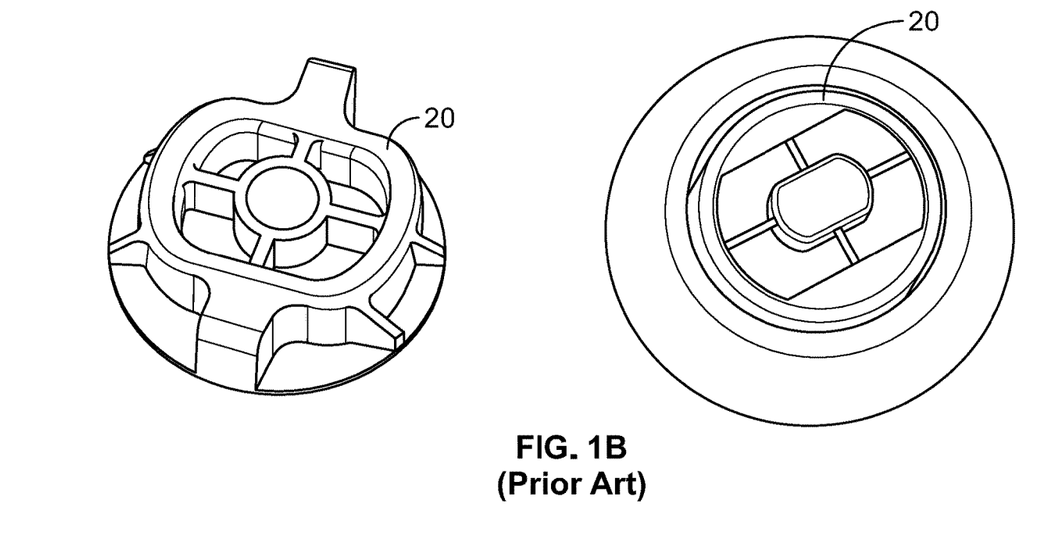

With reference to FIGS. 1A and 1B, certain known prior art hole plugs are shown, which include a cap and a contiguous circumferential wall 20 extending from the cap. The contiguous circumferential wall 20 facilitates attachment of the hole plug to the corresponding component, but also increases the weight of the hole plug.

Although existing hole plugs are generally small components, they are frequently used in large assemblies, and thus are often implemented in large quantities. Because assemblies frequently contain a plurality of hole plugs, the weight of the hole plugs can substantially affect the overall weight of the assembly. When hole plugs are utilized in industries where weight is a design consideration, such as the automotive industry, manufacturers are conscious of the weight of hole plugs being used in the final assembly.

Additionally, certain known hole plugs are sized and shaped to fit into a specific sized hole, and are not adaptable to fit in different sized holes. That is, such hole plugs are typically not configured to be modified. Further, when inserted into holes, certain known hole plugs lack a locking feature, leaving them susceptible to inadvertent removal from the holes.

SUMMARY

According to an aspect, a hole plug is configured to be secured within a hole of a component. The hole plug includes a main body having an inner surface, a perimeter, and which includes a center axis that is substantially perpendicular to the inner surface and defines an axial direction. Additionally, a securing member extends axially from the inner surface and includes a base directly secured to the inner surface of the main body and a cantilevered protuberance at least partially axially spaced from the inner surface. Furthermore, the protuberance at least partially extends along a circumferential path that is a parallel curve of the perimeter positioned inward from the perimeter.

According to another aspect, a method for assembling a hole plug with a component is recited. The hole plug includes a main body having an inner surface and a center axis that extends substantially perpendicular to the inner surface. The hole plug further includes a wave shaped securing member extending axially from the inner surface and which includes a protuberance axially spaced from the inner surface. The component includes a hole formed in a panel. The method for assembling the hole plug with the component includes the step of aligning the inner surface of the hole plug with the hole. Another step comprises moving the hole plug toward the hole in an axial direction aligned with the center axis. An additional step includes contacting the protuberance with a portion of the panel defining an edge of the hole, which then deflects the protuberance from an original position toward a deflected position radially inward from the original position. A further step includes moving the hole plug farther in the axial direction until the protuberance is axially beyond an inner surface of the panel. Another step includes returning the protuberance from the deflected position toward the original position until it is substantially behind the portion of the panel defining the edge of the hole.

According to still another aspect, a hole plug is configured to be secured within a hole of a component. The hole plug includes a main body having an inner surface, a perimeter, and which includes a center axis that is substantially perpendicular to the inner surface and defines an axial direction. At least two securing members extend axially from the inner surface and include a base directly secured to the inner surface of the main body and a cantilevered protuberance at least partially axially spaced from the inner surface. Additionally, the cantilevered protuberance extends at least partially along a circumferential path that is a parallel curve of the perimeter that is positioned inward from the perimeter. Further, no portion of the securing members extend beyond the perimeter of the main body, and the securing members are spaced equidistantly from one another along the circumferential path. Moreover, each securing member extends individually from the inner surface of the main body so that at least a portion of the inner surface along the circumferential path between the securing members is uninterrupted.

DETAILED DESCRIPTION OF THE DISCLOSURE

Figure 2:
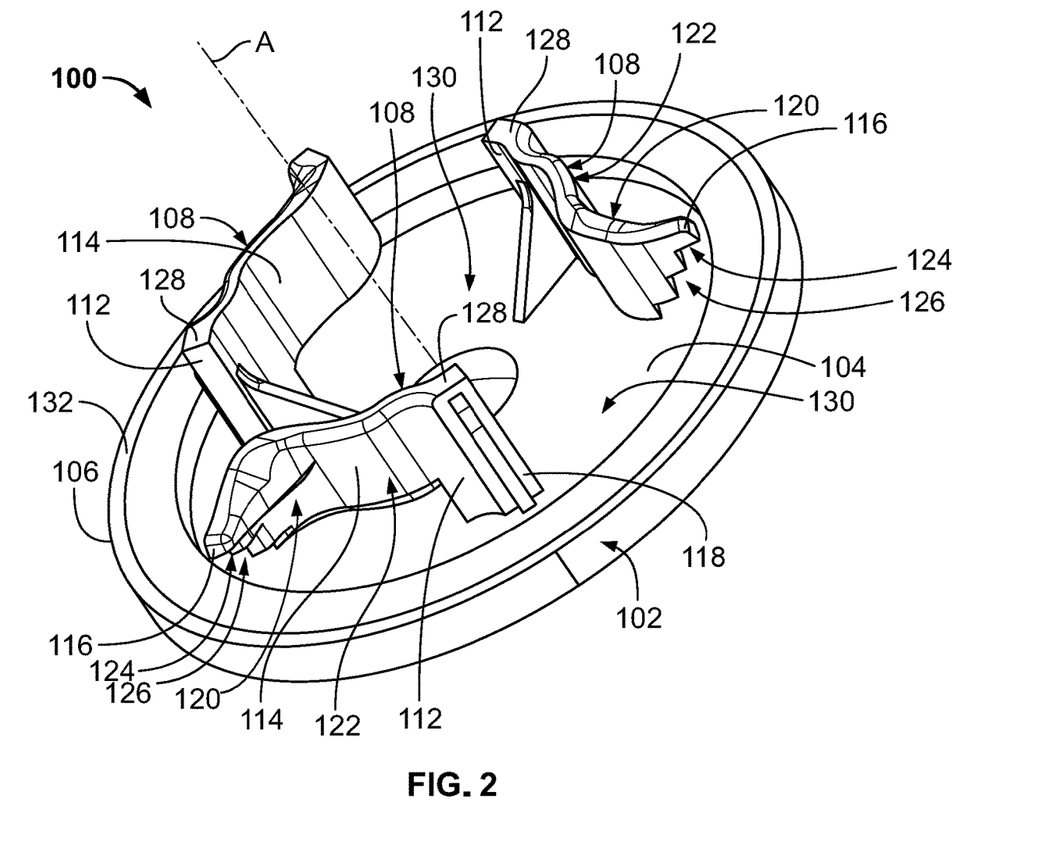
FIG. 2 is a perspective top view of a hole plug, according to an embodiment of the present disclosure.

FIGS. 2-10 illustrate various views of a hole plug 100 according to an embodiment of the present disclosure. With reference to FIG. 2, the hole plug 100 includes a main body 102 having an inner surface 104, a perimeter 106, and which defines a center axis A. The center axis A is substantially perpendicular to the inner surface 104 and defines an axial direction. The main body 102 is circular, enabling it to be accommodated within circular holes. The illustrated hole plug 100 has a diameter of 40 mm and is designed to be received within a hole having a diameter of 25 mm. However, it is anticipated that the concepts of the present disclosure may be applied to hole plugs of any size or geometric shape. For example, the hole plug 100 may be designed to be accommodated within a hole having a diameter of less than 25 mm, or greater than 25 mm, such as, for example, 51 mm.

The illustrated hole plug 100 further includes securing members 108 extending axially from the inner surface 104 of the main body 102. In the present embodiment, three individual securing members 108 are provided, each of which is substantially identical in size and shape to the others. However, the hole plug 100 may comprise any suitable number of securing members 108 of differing shapes and sizes. Each securing member 108 extends axially from the inner surface 104 and includes a base 112 directly secured to the inner surface 104 of the main body 102.

Figure 3:
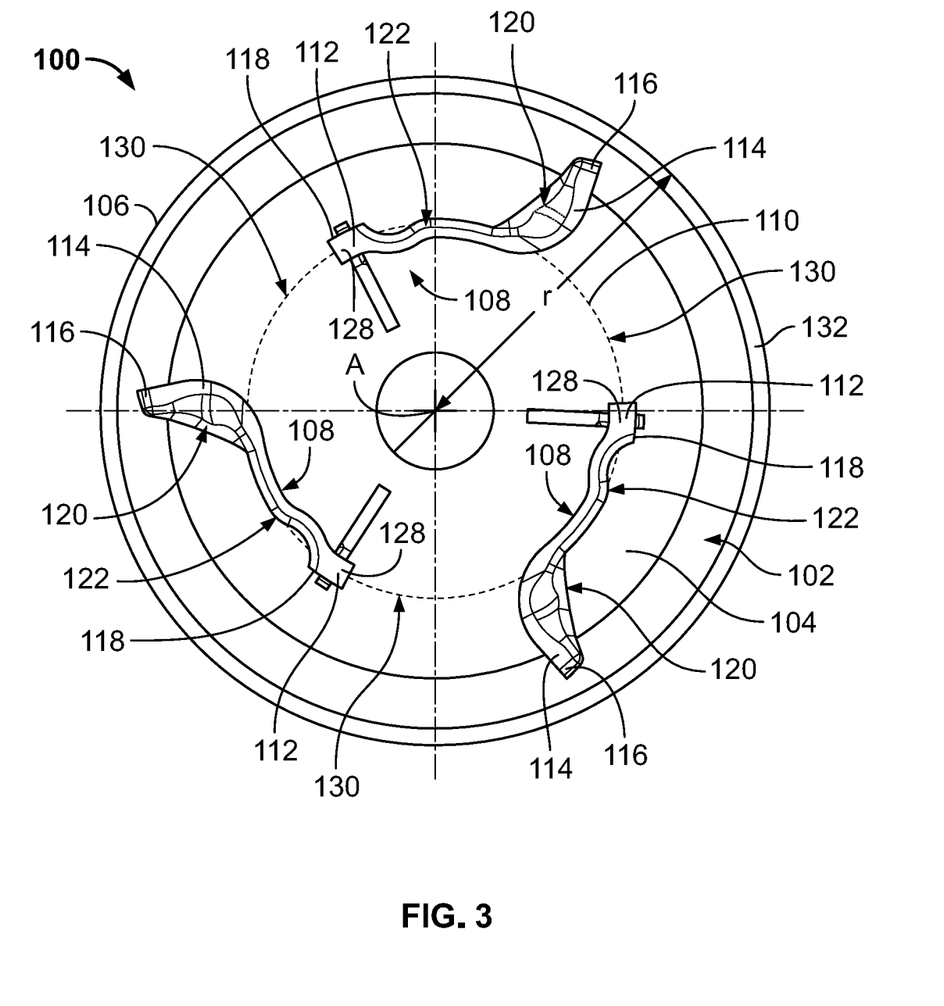
FIG. 3 is a top plan view of the hole plug of FIG. 2.

Turning to FIG. 3, each of the securing members 108 is spaced equidistantly from the other securing members 108 along a circumferential path 110, which is a parallel curve of the perimeter 106 of the main body 102. Further, the securing members 108 are disposed inward from the perimeter 106. The securing members 108 further comprise a cantilevered protuberance 114 that is spaced from the inner surface 104 and extends from the base 112 along the circumferential path 110. A portion of the protuberance 114 departs from the circumferential path 110. Specifically, a distal end 116 of the protuberance 114 is configured to extend toward the perimeter 106 of the main body 102. However, no portion of the securing member 108 extends beyond the perimeter 106 of the main body 102.

Still with reference to FIG. 3, the base 112 comprises an outermost surface 118 that is radially spaced from the center axis A of the main body 102 by more than half the distance between the center axis A and the perimeter 106. More specifically, the outermost surface 118 is spaced from the center axis A by 0.5 times a radius r plus an amount n, wherein n>0. Additionally, the distal end 116 of the protuberance 114 is spaced farther from the center axis A than the outermost surface 118 of the base 112.

The protuberances 114 shape a series of curved forms, and, as a result, may resemble a wave-like shape. Specifically, in the present embodiment, the protuberances 114 include a concave portion 120 and a convex portion 122. The curved forms allow the protuberances 114 to be flexible, resulting in the hole plug 100 having impressionable securing members 108. Specifically, the protuberances 114 can comply with hole size variation, allowing looser tolerances for a hole configured to receive the hole plug 100.

Figure 4:
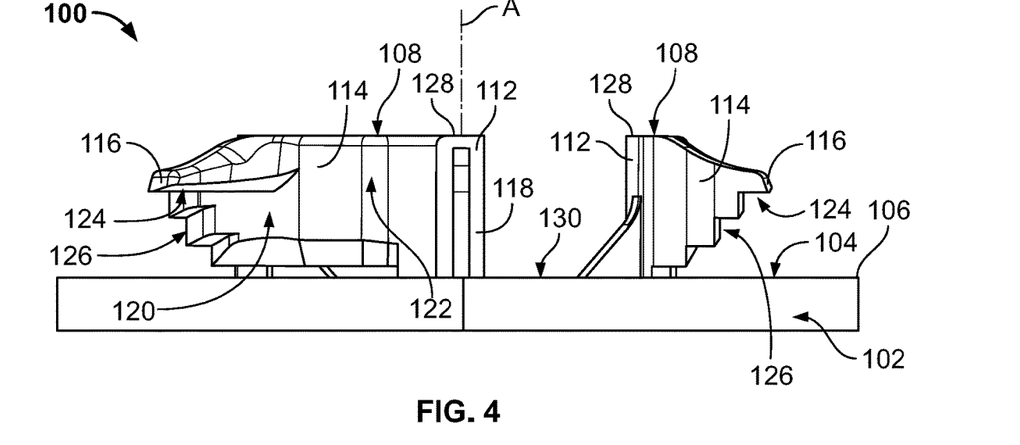
FIG. 4 is a side elevational view of the hole plug of FIG. 2.
Figure 5:
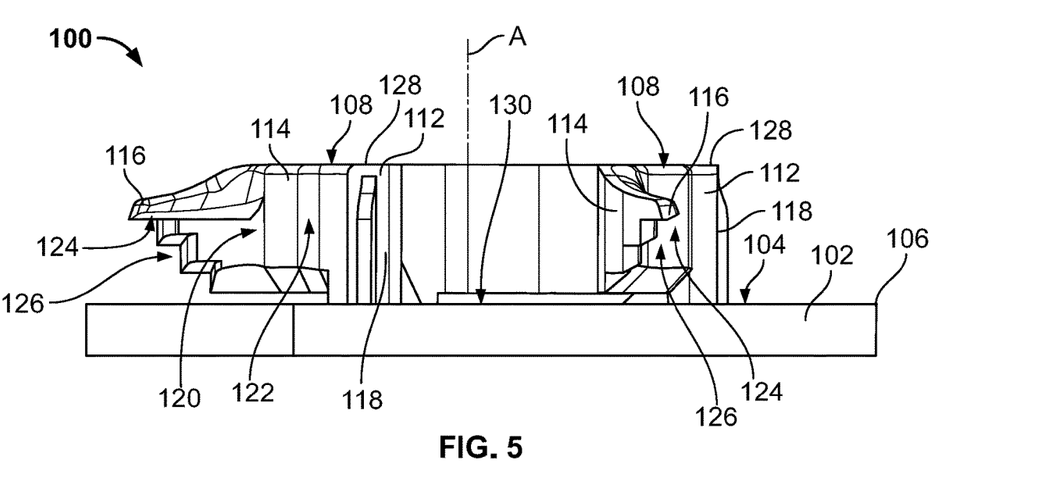
FIG. 5 is an additional side elevational view of the hole plug of FIG. 2.
Figure 6:
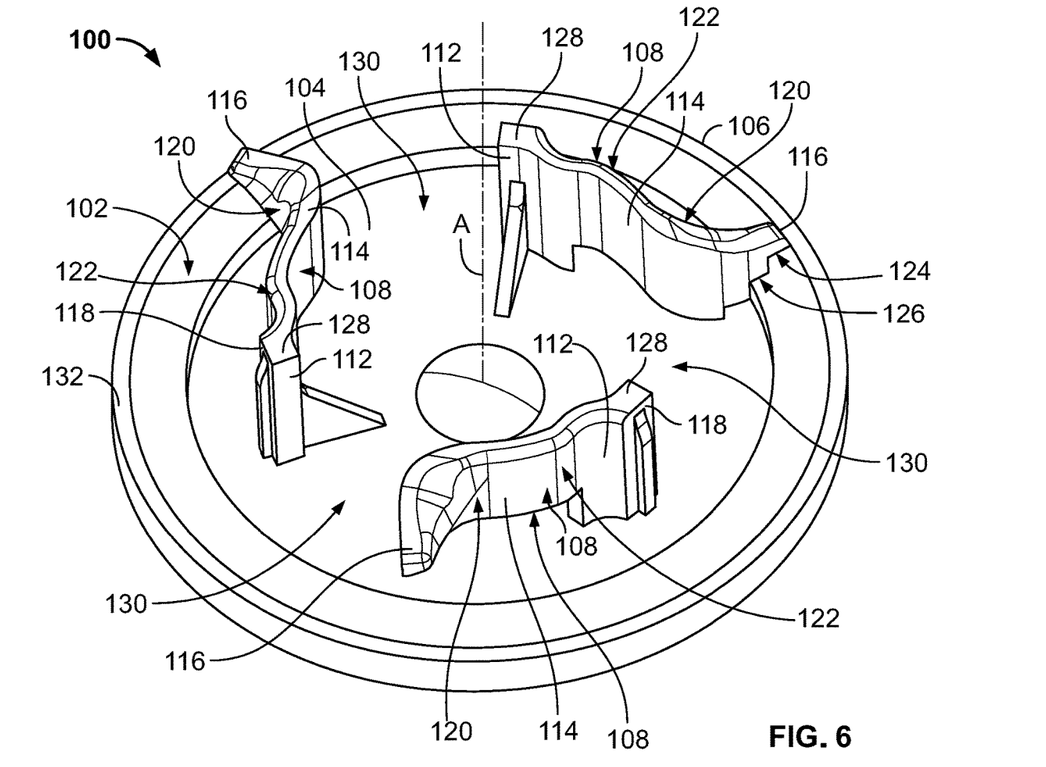
FIG. 6 is an additional perspective top view of the hole plug of FIG. 2.

Referring to FIGS. 4, 5, and 6, the protuberances 114 further include a lower surface 124 disposed at the distal end 116 defining a plurality of steps 126. Although the present embodiment contains a plurality of steps 126, embodiments of the present disclosure may include one step or no steps. The lower surface 124 at the distal end 116 is spaced from the inner surface 104 of the main body 102 by more than half the total height of the base 112 measured from the inner surface 104 to an upper end 128 of the base 112. The steps 126 enable the hole plug 100 to accommodate a range of panel thicknesses. As a non-limiting example, the hole plug 100 of the present embodiment is configured to accommodate panels having thicknesses of 0.6 mm to 3.0 mm. The securing members 108 assist in securing the hole plug 100 in a hole defined by a panel until an optional adhesive, such as glue, expands.

Referring again to FIG. 3, as previously described, the securing member 108 are disposed along the circumferential path 110 and provide a non-contiguous securing frame extending from the main body 102. Gaps 130 are provided between each securing member 108 and along the circumferential path 110. More specifically, the securing members 108 extend individually from the inner surface 104 of the main body 102 so that at least a portion of the inner surface 104 along the circumferential path 110 between the securing members 108 is uninterrupted, resulting in the hole plug 100 having a reduced weight. The size of these gaps 130 may be varied to achieve desired product weight specifications. In the present embodiment, the length of each gap 130 along the circumferential path 110 on the inner surface 104 is greater than the length of each region of the inner surface 104 directly connected to the base 112 of the securing member 108. Additionally, the thickness of each securing member 108 and/or the radius of the concave 120 and convex 122 portions on the protuberances 114 may be varied in order to provide a desired insertion force and/or extraction force.

Figure 7:
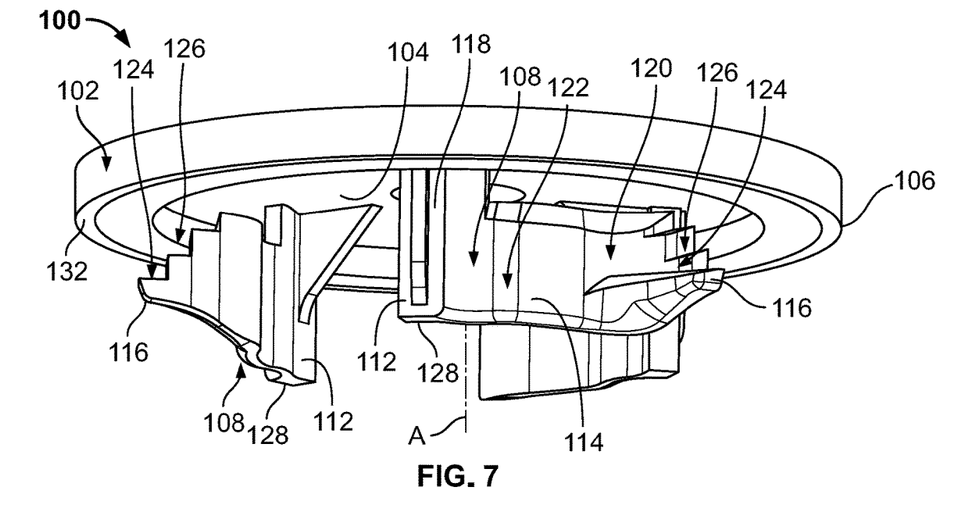
FIG. 7 is a perspective side view of the hole plug of FIG. 2.
Figure 8:
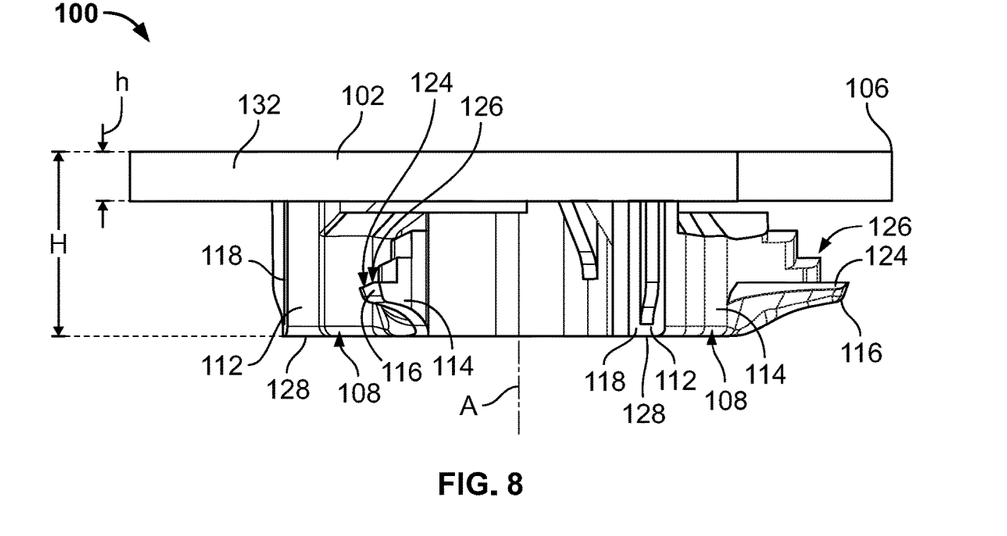
FIG. 8 is a different side elevational view of the hole plug of FIG. 2.
Figure 9:
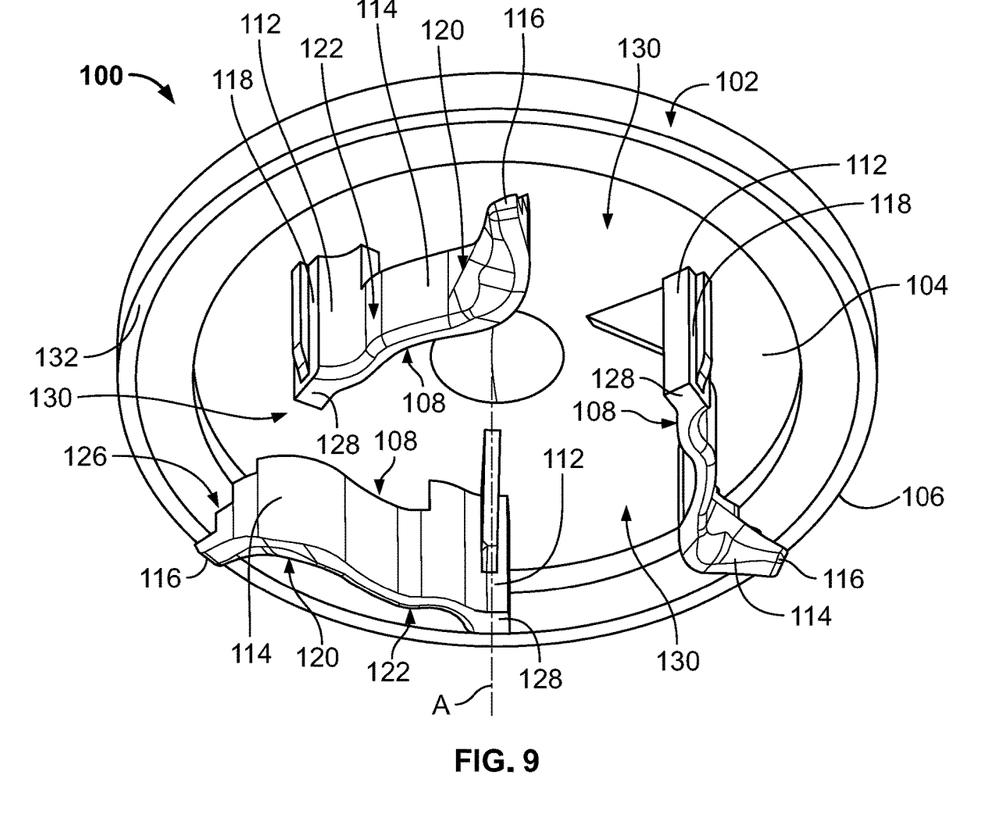
FIG. 9 is still another perspective top view of the hole plug of FIG. 2.
Figure 10:
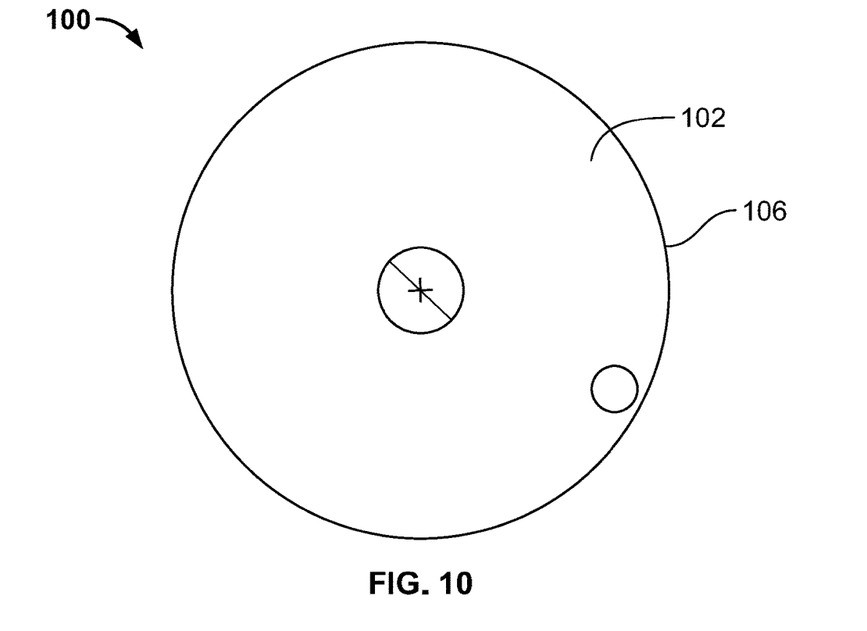
FIG. 10 is a bottom plan view of the hole plug of FIG. 2.

Referring to FIG. 7, the illustrated main body 102 further comprises a ridge 132 that protrudes axially from the perimeter 106 of the main body 102 substantially perpendicular to the inner surface 104. While the ridge 132 may be an optional structure for inclusion into the hole plug 100, it may provide additional desired stiffness to the hole plug 100. With reference to FIG. 8, the ridge 132 has a ridge height h, which can be varied to meet desired design specifications. Further, the hole plug 100 has a packaging height H, which may be varied to meet desired design specifications. It is understood that the packaging height H is greater than the ridge height h. Additionally, in some embodiments, the packaging height H may be twice the ridge height h. In other embodiments, the packaging height H may be at least three times the ridge height h. In the present embodiment, the hole plug 100 has a packaging height H of 9.7 mm and the ridge height h of less than a third of the packaging height H.

Figure 11:
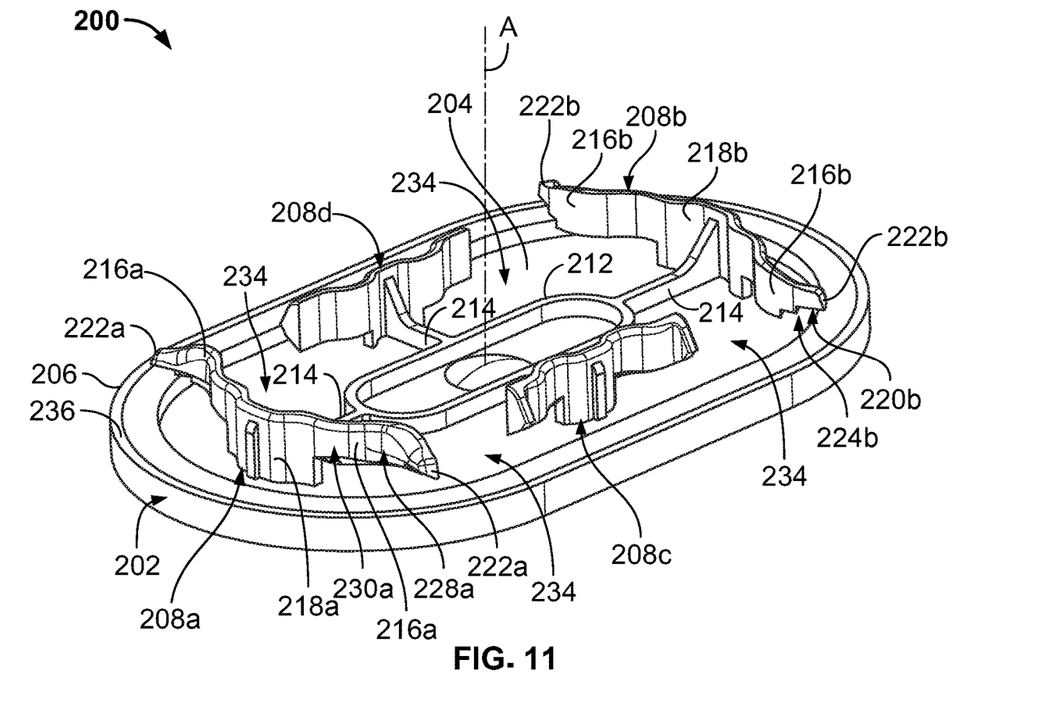
FIG. 11 is a perspective top view of a hole plug, according to another embodiment of the present disclosure.

FIGS. 11-15 illustrate various views of a hole plug 200 according to another embodiment of the present disclosure. Referring to FIG. 11, the hole plug 200 in the present embodiment is configured to accommodate oval shaped holes. Specifically, the presently disclosed hole plug 200 is designed to accommodate a 27×56 mm slot. The hole plug 200 includes a main body 202 having an inner surface 204, a perimeter 206, and which includes a center axis A. The center axis A is substantially perpendicular to the inner surface 204 and defines an axial direction.

Four individual securing members 208a, 208b, 208c, and 208d extend axially from the inner surface 204 of the main body 202, each having a substantially identical shape and size as the securing member 208a, 208b, 208c, and 208d positioned opposite thereof (i.e., securing members 208a and 208c are substantially identical to securing members 208b and 208d, respectively).

Figure 12:
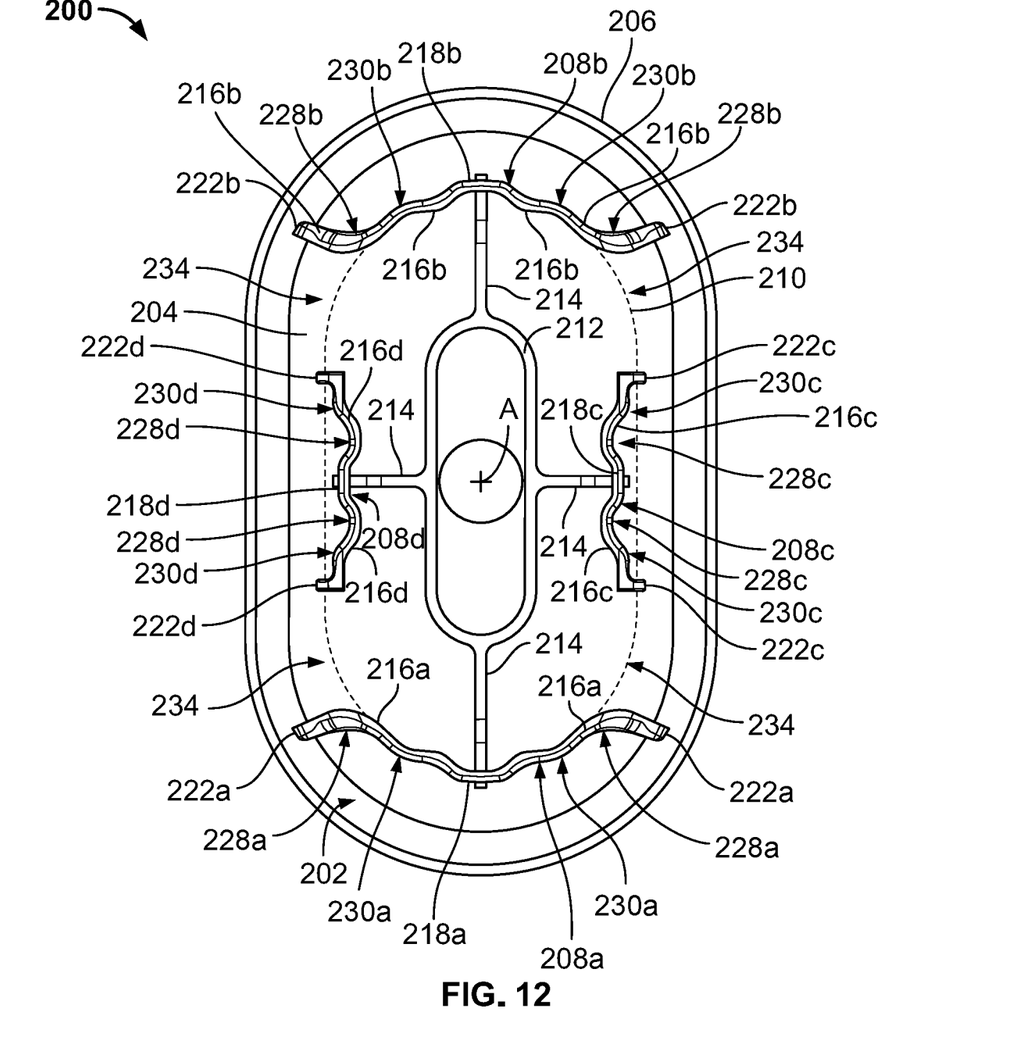
FIG. 12 is a top plan view of the hole plug of FIG. 12.

Turning to FIG. 12, each of the securing members 208a, 208b, 208c, and 208d is spaced equidistantly from the adjacent securing members 208a, 208b, 208c, and 208d along a circumferential path 210, which is a parallel curve of the perimeter 206 disposed inward from the perimeter 206. In the present embodiment, the securing members 208a, 208b, 208c, and 208d connect to a central rim 212 extending from the main body 202 through coupling beams 214.

The securing members 208a, 208b, 208c, and 208d include similar functional attributes as the securing members 108 of the embodiment illustrated in FIGS. 2-10. However, the securing members 208a, 208b, 208c, and 208d of the present embodiment each comprise two distinct protuberances 216a, 216b, 216c, and 216d extending from a base 218a, 218b, 218c, and 218d.

Figure 13:
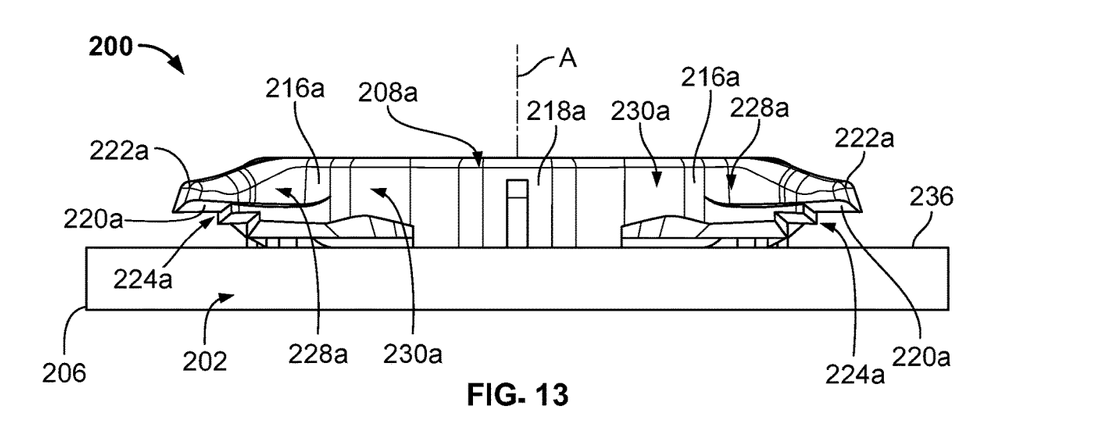
FIG. 13 is a side elevational view of the hole plug of FIG. 12.

Still referring to FIG. 12, the securing member 208a includes the base 218a and the two distinct protuberances 216a extending from the base 218a in opposite directions along the circumferential path 210. Turning to FIG. 13, the two protuberances 216a are substantially identical and include lower surfaces 220a that are disposed at distal ends 222a thereof. Additionally, a plurality of steps 224a are positioned on the lower surfaces 220a of the protuberances 216a. Returning to FIG. 12, similar to the aforementioned embodiment, the protuberances 216a include a series of curved forms, and, as a result, may resemble a wave-like shape. Specifically, in the present embodiment, the protuberances 216a may include concave portions 228a and convex portions 230a. As previously stated, the curved forms allow the protuberances 216a to be flexible, resulting in the hole plug 200 having the impressionable securing member 208a. Specifically, the protuberances 216a can comply with hole size variation, allowing looser tolerances for a hole configured to receive the hole plug 200. Disposed on the main body 202 opposite from the securing member 208a is the securing member 208b. This securing member 208b is substantially structurally similar to 208a.

Figure 14:
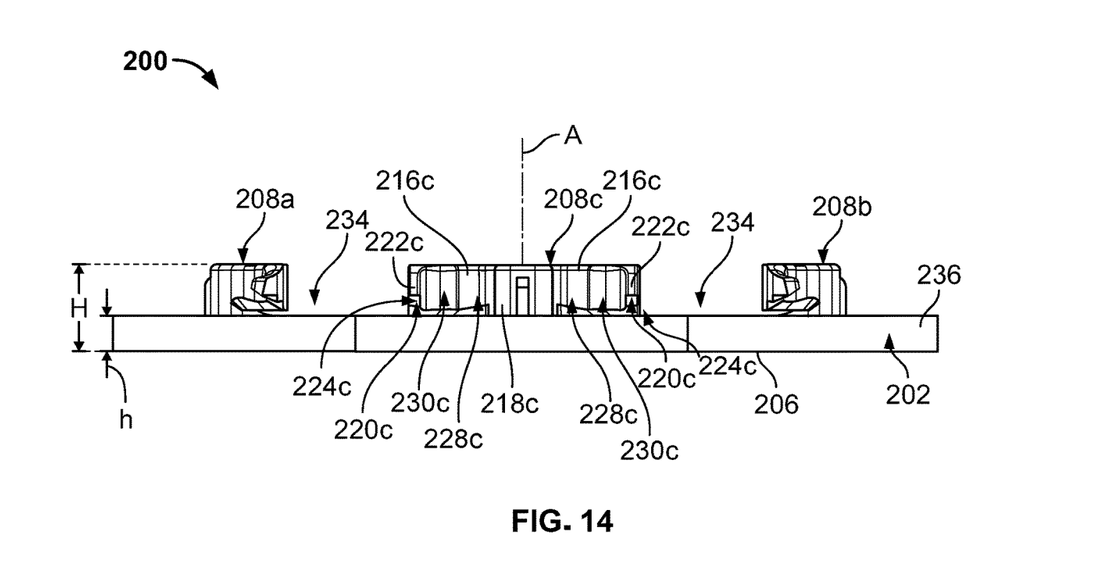
FIG. 14 is a different side elevational view of the hole plug of FIG. 12.
Figure 15:
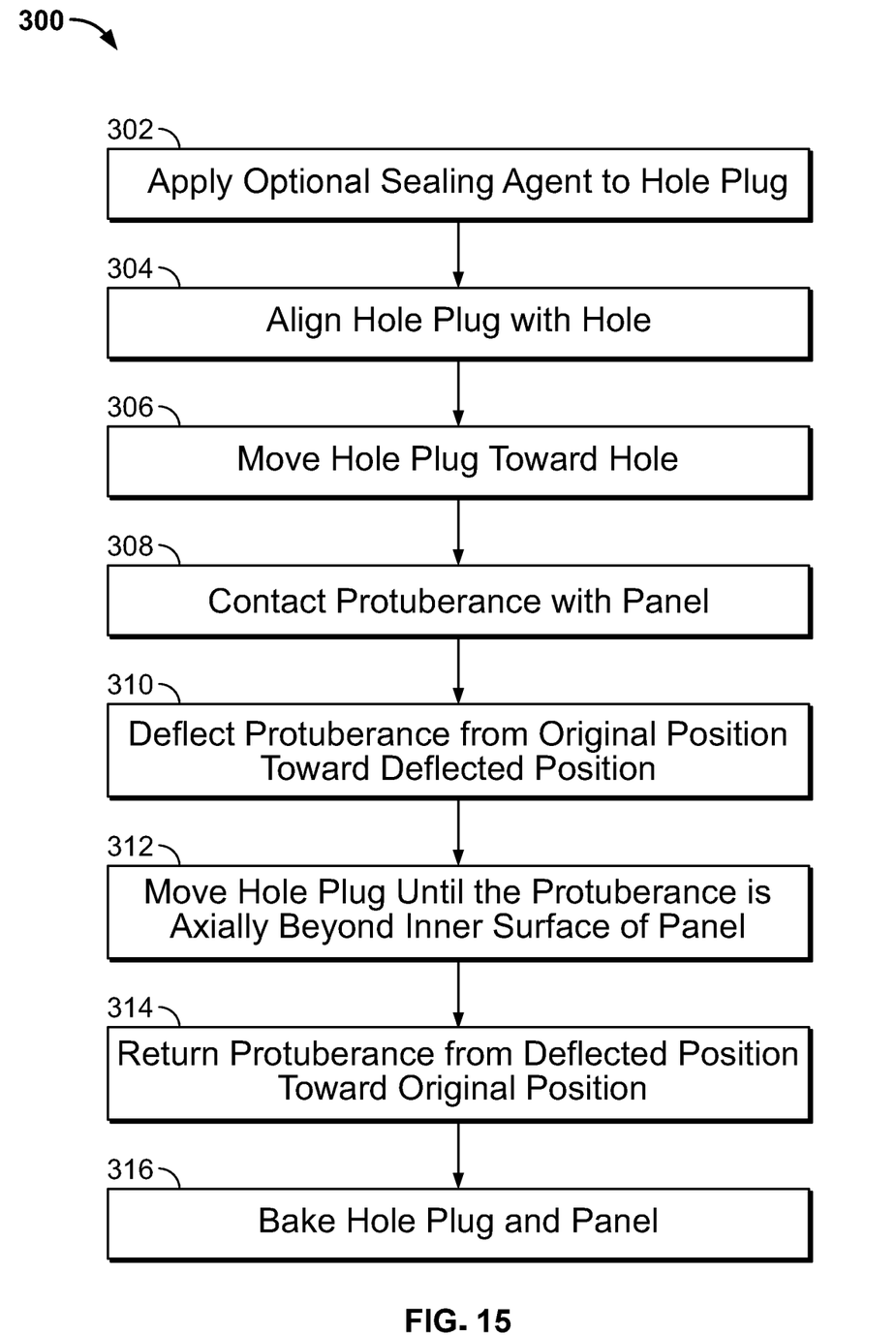
FIG. 15 is a block diagram illustrating a method for using the hole plugs of FIGS. 2 and 11.

Furthermore, the securing member 208c is located between securing members 208a and 208b along the circumferential path 210. This securing member 208c also includes the two substantially identical protuberances 216c extending from the base 218c in opposite directions along the circumferential path 210. Turning to FIG. 14, like securing members 208a and 208b, the protuberances 216c include lower surfaces 220c disposed at distal ends 222c thereof. This securing member 208c, however, includes only one step 224c located on the lower surfaces 220c of the protuberances 216c. Returning again to FIG. 12, the protuberances 216c further include concave portions 228c and convex portions 230c. Finally, the fourth securing member 208d is disposed on the main body 202 opposite from the securing member 208c and between securing members 208a and 208b along the circumferential path 210. This securing member 208d is substantially structurally similar to 208c. Like the previous embodiment of the present disclosure, gaps 234 exist on the inner surface 204 between each securing member 208a, 208b, 208c, and 208d. More specifically, the securing members 208a, 208b, 208c, and 208d extend individually from the inner surface 204 of the main body 202 so that at least a portion of the inner surface 204 along the circumferential path 210 between the securing members 208a, 208b, 208c, and 208d is uninterrupted, resulting in the hole plug 200 having a reduced weight.

FIG. 16 illustrates a method 300 for using the hole plug 100, 200 of the present disclosure with a component defining a hole within a panel. At a step 302, an optional sealing agent may be applied to the hole plug 100, 200 prior to assembly to create a fluid-tight seal between the hole plug 100, 200 and the panel. At a step 304, the inner surface 104, 204 of the hole plug 100, 200 is aligned with the hole. At a step 306, after aligning the hole plug 100, 200 with the hole, the hole plug 100, 200 is moved in the axial direction toward the hole. During a step 308, the hole plug 100, 200 is moved until the protuberances 114, 216 contact a portion of the panel defining an edge of the hole. At a step 310, continued axial movement causes the protuberances 114, 216 to deflect from an original position toward a deflected position, which is radially inward from the original position. Specifically, each protuberance 114, 216 pivots about an axis substantially parallel to the axial direction. Then, at a step 312, the hole plug 100, 200 is moved farther in the axial direction until the protuberances 114, 216 are axially beyond a second surface of the panel. At step 314, the protuberances 114, 216 return from the deflected position toward the original position so that the protuberances 114, 216 are substantially behind the portion of the panel defining the edge of the hole. Once the hole plug 100, 200 and component are assembled, the inner surface 104, 204 of the hole plug 100, 200 and the protuberances 114, 216 are in contact with a first surface of the panel and the second surface of the panel, respectively. If the optional sealing agent was used, a step 316 is conducted, during which the panel and the hole plug 100, 200 are baked to set the sealing agent. During assembly and baking, the ridge 132, 236 extending from the main body 102, 202 ensures the sealing agent remains centered on the hole plug 100, 200.

For the aforementioned embodiments, the force required to insert the hole plug 100, 200 into the hole, also called the insertion force, is low compared to certain known hole plugs. The insertion force is low due to the non-contiguous frame design and the securing members 108, 208 having flexible protuberances 114, 216. Having less material along the circumferential path 110, 210 allows the securing members 108, 208 to deflect easily. Specifically, because the force required to deflect an element, such as the securing members 108, 208, is a function of the element's shape and dimensions, the securing members 108, 208 of the present disclosure require less force to deflect when inserting the hole plug 100, 200 into a panel.

The hole plug 100, 200 also exhibits a high extraction force compared to certain known hole plugs. The protuberances 114, 216 act as locking features that are configured to lock onto portions of the panel surrounding the hole. Specifically, as previously mentioned, when assembling the hole plug 100, 200 to a component, the protuberances 114, 216 sit against the second surface of the component to anchor the hole plug 100, 200 in place.

Additionally, the hole plug 100, 200 of the present disclosure is efficiently manufactured, thereby reducing the cost of tooling and manufacturing. Specifically, the hole plug 100, 200 may only require two slides in the mold assembly, whereas certain known hole plugs require four slides.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

We claim:

1. A hole plug configured to be secured within a hole of a component, the hole plug comprising:
    a main body having an inner surface, a perimeter, and which includes a center axis, wherein the center axis is substantially perpendicular to the inner surface and defines an axial direction; and
    a securing member extending axially from the inner surface and including a base directly secured to the inner surface of the main body and a cantilevered protuberance at least partially axially spaced from the inner surface and partially extending along a circumferential path,
    wherein the cantilevered protuberance has a wave-like shape profile that partially extends along a circumferential path,
    wherein a lower surface extends between a concave portion disposed between a distal end of the cantilevered protuberance and a sidewall of the cantilevered protuberance, the lower surface being parallel with the inner surface of the main body and defining a first thickness,
    wherein the cantilevered protuberance includes a plurality of steps axially spaced from the inner surface, the plurality of steps defining a second thickness,
    wherein the first thickness is greater than the second thickness, and
    wherein the circumferential path is a parallel curve of the perimeter positioned inward from the perimeter.

2. The hole plug of claim 1, wherein the distal end of the protuberance extends toward the perimeter of the main body.

3. The hole plug of claim 1, wherein no portion of the securing member extends beyond the perimeter of the main body.

4. The hole plug of claim 3, the base further comprising an outermost surface, wherein the outermost surface of the base is spaced from the center axis of the main body more than half the distance between the center axis of the main body and the perimeter of the main body.

5. The hole plug of claim 4, wherein the distal end of the protuberance is spaced from the center axis farther than the outermost surface of the base.

6. The hole plug of claim 1, wherein the protuberance forms a series of curves.

7. The hole plug of claim 6, wherein the protuberance includes at least one concave and one convex portion.

8. The hole plug of claim 1, wherein the lower surface is axially spaced from the inner surface of the main body by at least half the total height of the base measured between the inner surface and an upper end of the base.

9. The hole plug of claim 1, wherein the hole plug comprises at least two securing members.

10. The hole plug of claim 9, wherein the securing members are spaced equidistantly from one another along the circumferential path.

11. The hole plug of claim 10, wherein the securing members extend individually from the inner surface of the main body so that at least a portion of the inner surface along the circumferential path between the securing members is uninterrupted.

12. The hole plug of claim 11, wherein a length of the portion of the inner surface along the circumferential path between the securing members that is uninterrupted is greater than the length of the portion of the inner surface along the circumferential path directly connected to the base of the securing members.

13. The hole plug of claim 1, wherein the securing member comprises at least two wave-like shape cantilevered protuberances.

14. The hole plug of claim 13, wherein the wave-like shape protuberances extend from the base in opposite directions along the circumferential path.

15. The hole plug of claim 1, further comprising a ridge protruding axially along the perimeter of the main body and substantially perpendicular to the inner surface of the main body.

16. A method for assembling a hole plug with a component, the hole plug including a main body having an inner surface, wherein a center axis extends substantially perpendicular to the inner surface and defines an axial direction, the hole plug further including a wave shaped securing member extending axially from the inner surface and including a protuberance axially spaced from the inner surface, the protuberance having a lower surface extending between a concave portion disposed between a distal end of the protuberance and a sidewall of the protuberance and the lower surface being parallel to the inner surface of the main body, a thickness of the lower surface greater than a thickness of the sidewall, and the component including a hole formed in a panel, the method comprising:
    aligning the inner surface of the hole plug with the hole;
    moving the hole plug toward the hole in an axial direction aligned with the center axis;
    contacting the protuberance with a portion of the panel defining an edge of the hole;
    deflecting the protuberance from an original position toward a deflected position radially inward from the original position;
    moving the hole plug in the axial direction until the protuberance is axially beyond an inner surface of the panel; and
    returning the protuberance from the deflected position toward the original position until it is substantially behind the portion of the panel defining the edge of the hole.

17. The method of claim 16, wherein deflecting the protuberance includes pivoting the protuberance about an axis substantially parallel to the center axis.

18. The method of claim 17, further comprising contacting the inner surface of the hole plug with a first surface of the panel and contacting the protuberance with a second surface of the panel.

19. A hole plug configured to be secured within a hole of a component, the hole plug comprising:
- a main body having an inner surface, a perimeter, and which includes a center axis, wherein the center axis is substantially perpendicular to the inner surface and defines an axial direction; and
- at least two securing members extending axially from the inner surface and including a base directly secured to the inner surface of the main body and a cantilevered protuberance,
- wherein the cantilevered protuberance extends in a longitudinal direction that is parallel to the inner surface of the main body, the cantilevered protuberance including a lower surface and a plurality of steps disposed toward a distal end of the cantilevered protuberance, the lower surface defining a first thickness and the plurality of steps defining a second thickness, the first thickness different from the second thickness, and
- wherein no portion of the securing members extend beyond the perimeter of the main body, and the securing members are spaced equidistantly from one another along the circumferential path, and extend individually from the inner surface of the main body so that at least a portion of the inner surface along the circumferential path between the securing members is uninterrupted.

* * * * *